United States Patent
Vemula et al.

(10) Patent No.: US 10,138,744 B2
(45) Date of Patent: Nov. 27, 2018

(54) TURBOCHARGER WITH VARIABLE TURBINE GEOMETRY HAVING GROOVED GUIDE VANES

(71) Applicant: BorgWarner Inc., Auburn Hills, MI (US)

(72) Inventors: Rajendra Vemula, Arden, NC (US); Robert Lotz, Arden, NC (US); George Edward Heddy, III, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 476 days.

(21) Appl. No.: 14/370,848

(22) PCT Filed: Jan. 10, 2013

(86) PCT No.: PCT/US2013/020931
§ 371 (c)(1),
(2) Date: Jul. 7, 2014

(87) PCT Pub. No.: WO2013/106503
PCT Pub. Date: Jul. 18, 2013

(65) Prior Publication Data
US 2015/0152741 A1  Jun. 4, 2015

Related U.S. Application Data

(60) Provisional application No. 61/586,266, filed on Jan. 13, 2012.

(51) Int. Cl.
*F01D 11/00* (2006.01)
*F01D 17/16* (2006.01)
*F02B 37/24* (2006.01)
*F01D 5/20* (2006.01)
*F01D 11/08* (2006.01)

(52) U.S. Cl.
CPC ............... *F01D 11/00* (2013.01); *F01D 5/20* (2013.01); *F01D 11/08* (2013.01); *F01D 17/16* (2013.01);
(Continued)

(58) Field of Classification Search
CPC . F01D 5/20; F01D 11/00; F01D 11/08; F01D 17/16; F01D 17/165; F01D 5/141;
(Continued)

(56) References Cited

U.S. PATENT DOCUMENTS 3,101,926 A * 8/1963 Fritz Weber .......... F01D 17/162
277/358
4,619,580 A   10/1986 Snyder
(Continued)

FOREIGN PATENT DOCUMENTS

JP    S55161001 A   12/1980
JP    S5757204 U    4/1982
(Continued)

OTHER PUBLICATIONS

Chinese Office Action dated Sep. 26, 2017 ; Application No. 201380004490.6; Applicant: BorgWarner Inc.; 29 pages.
(Continued)

*Primary Examiner* — Woody Lee, Jr.
*Assistant Examiner* — Jesse Prager
(74) *Attorney, Agent, or Firm* — BrooksGroup

(57) ABSTRACT

A plurality of guide vanes (34) in a variable turbine geometry turbocharger (10) regulates a flow of exhaust gas. The guide vanes (34) are selectively adjustable between an open position to allow the flow of exhaust gas to drive a turbine wheel (24) and a closed position to block the flow of exhaust gas. A first flow feature (58) is disposed on first (44) and second (46) edges of the guide vanes (34) to disturb the flow of exhaust gas to prevent leakage of exhaust gas around the (Continued)

first (44) and second (46) edges. A second flow feature (64) is disposed on front (60) and rear (62) surfaces of the guide vanes (34) to channel the flow of exhaust gas between adjacent guide vanes (34) when the guide vanes (34) are in the open position to prevent swirling and/or cross flow of the exhaust gas.

17 Claims, 4 Drawing Sheets

(52) U.S. Cl.
CPC ............ *F01D 17/165* (2013.01); *F02B 37/24* (2013.01); *F05D 2220/40* (2013.01); *F05D 2240/125* (2013.01); *F05D 2250/294* (2013.01); *Y02T 10/144* (2013.01)

(58) Field of Classification Search
CPC ...... F02B 37/22; F02B 37/24; F05D 2220/40; F05D 2250/294; F05D 2240/123; F05D 2240/124; F05D 2240/125; F05D 2240/126
See application file for complete search history.

(56) References Cited

U.S. PATENT DOCUMENTS

| | | | | |
|---|---|---|---|---|
| 4,682,933 | A * | 7/1987 | Wagner | F01D 5/20 415/173.5 |
| 5,146,752 | A * | 9/1992 | Bruestle | F01D 17/105 415/164 |
| 6,213,711 | B1 * | 4/2001 | Muller | F01D 5/145 415/191 |
| 7,137,778 | B2 * | 11/2006 | Marcis | F02C 6/12 415/163 |
| 8,172,508 | B2 * | 5/2012 | Mohamed | F01D 5/141 415/115 |
| 8,221,059 | B2 * | 7/2012 | Brown | F01D 17/143 415/157 |
| 2006/0051209 | A1 * | 3/2006 | Lee | F01D 5/186 416/97 R |
| 2010/0098529 | A1 * | 4/2010 | Roby | F01D 17/165 415/160 |
| 2011/0194929 | A1 * | 8/2011 | Denholm | F01D 17/143 415/157 |

FOREIGN PATENT DOCUMENTS

| | | |
|---|---|---|
| JP | 62-108501 | 7/1987 |
| JP | 07-279809 | 10/1995 |
| JP | 2002364374 A * | 12/2002 |
| JP | 2005-519219 | 6/2005 |
| JP | 2011117463 A | 6/2011 |
| KR | 10-2010-0115021 | 10/2010 |

OTHER PUBLICATIONS

Chinese Office Action dated Aug. 23, 2016; Application No. 201380004490.6; Applicant: BorgWarner Inc.; 18 pages.
Korean Office Action dated Aug. 22, 2018; Application No. 10-2014-7021809; Applicant BorgWarner Inc.; 15 pages.

* cited by examiner

TURBOCHARGER WITH VARIABLE TURBINE GEOMETRY HAVING GROOVED GUIDE VANES

CROSS-REFERENCE TO RELATED APPLICATIONS

This application claims priority to and all the benefits of U.S. Provisional Application No. 61/586,266, filed on Jan. 13, 2012, and entitled "Turbocharger With Variable Turbine Geometry Having Grooved Guide Vanes."

BACKGROUND OF THE INVENTION

1. Field of the Invention

This invention relates to a turbocharger for an internal combustion engine. More particularly, this invention relates to a turbocharger with variable turbine geometry having guide vanes with features to control exhaust gas flow.

2. Description of Related Art

A turbocharger is a type of forced induction system used with internal combustion engines. Turbochargers deliver compressed air to an engine intake, allowing more fuel to be combusted, thus boosting an engine's horsepower without significantly increasing engine weight.

Thus, turbochargers permit the use of smaller engines that develop the same amount of horsepower as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

Turbochargers typically include a turbine housing connected to the engine's exhaust manifold, a center bearing housing, and a compressor housing connected to the engine's intake manifold. A turbine wheel in the turbine housing is rotatably driven by an inflow of exhaust gas supplied from the exhaust manifold. A shaft rotatably supported in the center bearing housing connects the turbine wheel to a compressor impeller in the compressor housing so that rotation of the turbine wheel causes rotation of the compressor impeller. As the compressor impeller rotates, it increases the air mass flow rate, airflow density and air pressure delivered to the engine's cylinders via the engine's intake manifold.

It is often advantageous to regulate the exhaust gas flowing to the turbine wheel to improve efficiency, responsiveness or the operating range of the turbocharger. One method of regulating the exhaust gas flowing to the turbine wheel is commonly referred to by several names, including Variable Turbine Geometry (VTG), Variable Geometry Turbine (VGT), Variable Nozzle Turbine (VNT), or simply Variable Geometry (VG). VTG turbochargers include a plurality of adjustable guide vanes pivotally supported by a vane support ring within a wheel inlet leading to the turbine wheel. The space between adjacent guide vanes constitutes flow channels for the exhaust gas flowing to the turbine wheel and the geometry of the flow channels is adjustable by adjusting the guide vanes within a pre-determined range of angular positions between an open position and a closed position. In order to provide a high boost pressure at low engine speeds, the guide vanes are adjusted to constrict the flow channels between adjacent guide vanes. This results in the exhaust gas moving through the flow channels at a high speed. The increased kinetic energy of the exhaust gas is transferred to the turbine wheel, increasing the boost pressure. At high engine speeds, the guide vanes are adjusted to open up the flow channels between adjacent guide vanes. This results in the exhaust gas impacting the turbine wheel at a lower speed, thus decreasing the boost pressure.

Spacing between the vane support ring and a ring-shaped wall of the turbine housing, in conjunction with the width of the guide vanes, is critical to prevent leakage of the exhaust gas around edges of the guide vanes. Clearance is provided between the edges of the guide vanes and the vane support ring and the ring-shaped wall to permit pivotal movement of the guide vanes and to allow for thermal expansion due to the hot exhaust gas. When the guide vanes are in the closed position, such clearance will lead to a problem of leakage of the exhaust gas around the edges of the guide vanes. Similarly, when the guide vanes are opened, such clearance also results in leakage of the exhaust gas around the edges of the guide vanes, rather than directing all the exhaust gas through the flow channels, thereby reducing the efficiency of the turbocharger.

In addition, when the guide vanes are adjusted to the open position or an angular position between the open and closed positions, the exhaust gas is guided through the flow channels toward the turbine wheel by opposing surfaces of adjacent guide vanes. As the exhaust gas flows between adjacent guide vanes, high and low pressure regions will lead to swirling and transverse flow of the exhaust gas rather than smooth flow of the exhaust gas along the length of the guide vanes.

It is desirable therefore to provide a turbocharger with guide vanes that prevent or minimize leakage of the exhaust gas. It is also desirable to provide guide vanes that prevent or minimize swirling and transverse flow of the exhaust gas within flow channels between adjacent guide vanes.

SUMMARY OF THE INVENTION

According to one aspect of the invention, a plurality of guide vanes is provided for regulating a flow of exhaust gas through a wheel inlet to a turbine wheel in a variable turbine geometry turbocharger. The guide vanes are selectively adjustable between a range of angular positions between an open position to allow the flow of exhaust gas to drive the turbine wheel and a closed position to block the flow of exhaust gas to the turbine wheel. Each guide vane includes a body extending between a leading edge and a trailing edge. The body of each guide vane includes opposing first and second edges and opposing front and rear surfaces. The first edge is adjacent to one side of the wheel inlet and the second edge is adjacent to another side of the wheel inlet. A first flow feature is disposed on the first and second edges of each guide vane.

The first flow feature is designed to disturb the flow of exhaust gas to prevent leakage of exhaust gas around the first and second edges of the guide vanes. A second flow feature is disposed on the front and rear surfaces of each guide vane. The second flow feature is designed to channel the flow of exhaust gas between adjacent guide vanes from the leading edge to the trailing edge when the guide vanes are in the open position to prevent swirling and/or cross flow of the exhaust gas. The guide vanes may include both the first and second flow features or may include only one of the first and second flow features.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
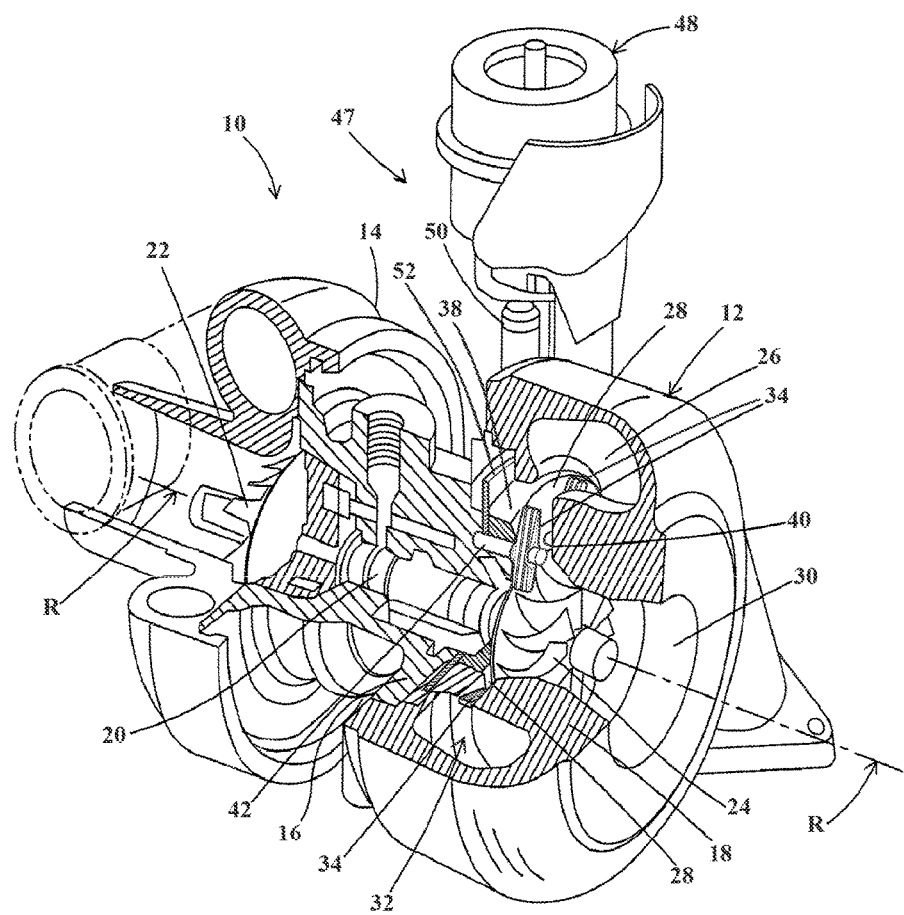
FIG. 1 is a partially-sectioned perspective view of a variable turbine geometry turbocharger.

Referring to the Figures, a turbocharger is illustrated generally at 10 in FIG. 1. The turbocharger 10 includes a housing assembly 12 comprising a compressor housing 14, a bearing or center housing 16, and a turbine housing 18 that are connected to each other. The bearing housing 16 supports a rotatable shaft 20 that extends in an axial direction and defines an axis of rotation R. A compressor impellor 22 is mounted on one end of the shaft 20 and is housed within the compressor housing 14. A turbine wheel 24 is mounted on an opposite end of the shaft 20 and is housed within the turbine housing 18. The turbine housing 18 defines a volute 26 that is coupled to an exhaust manifold (not shown) and evolves into a wheel inlet 28 for directing a flow of exhaust gas from the exhaust manifold to the turbine wheel 24. As is well known in the art, the turbine wheel 24 is rotatably driven by the exhaust gas supplied from the exhaust manifold, which rotates the shaft 20, thereby causing the compressor impeller 22 to rotate. In other words, the compressor impeller 22 is rotatably driven by the turbine wheel 24. After driving the turbine wheel 24, the exhaust gas is discharged from the turbine housing 18 through a central exit pipe or exducer 30.

In order to maximize the efficiency of the turbocharger 10, it is common to control or regulate the exhaust gas flowing to the turbine wheel 24. In the present embodiment of the invention, a guide apparatus 32 is provided for regulating the flow of exhaust gas to the turbine wheel 24. The guide apparatus 32 is positioned within the turbine housing 18 and includes a plurality of guide vanes 34 located within the wheel inlet 28 leading to the turbine wheel 24. The space between adjacent guide vanes 34 defines a flow channel or nozzle throat 35, best seen in FIG. 3, through which the exhaust gas flows to the turbine wheel 24. By varying an angular position of the guide vanes 34, the cross-section of the flow channels 35 are adjustable.

Figure 2:
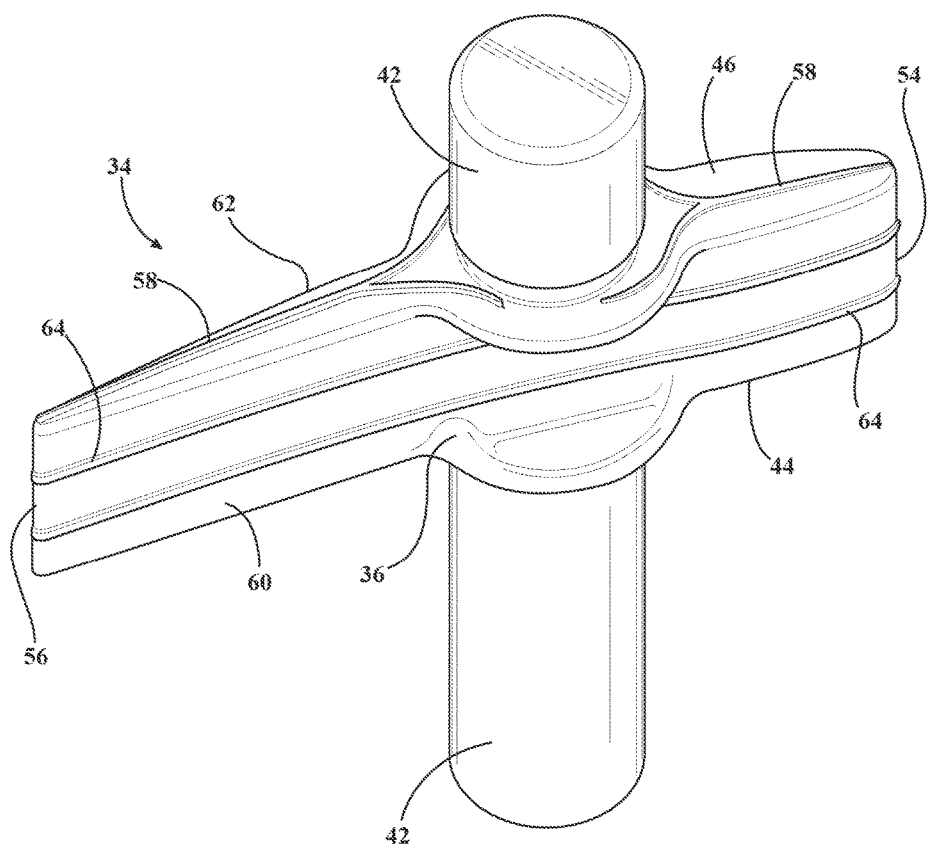
FIG. 2 is a perspective view of a guide vane with first and second flow features according to the invention.
Figure 3:
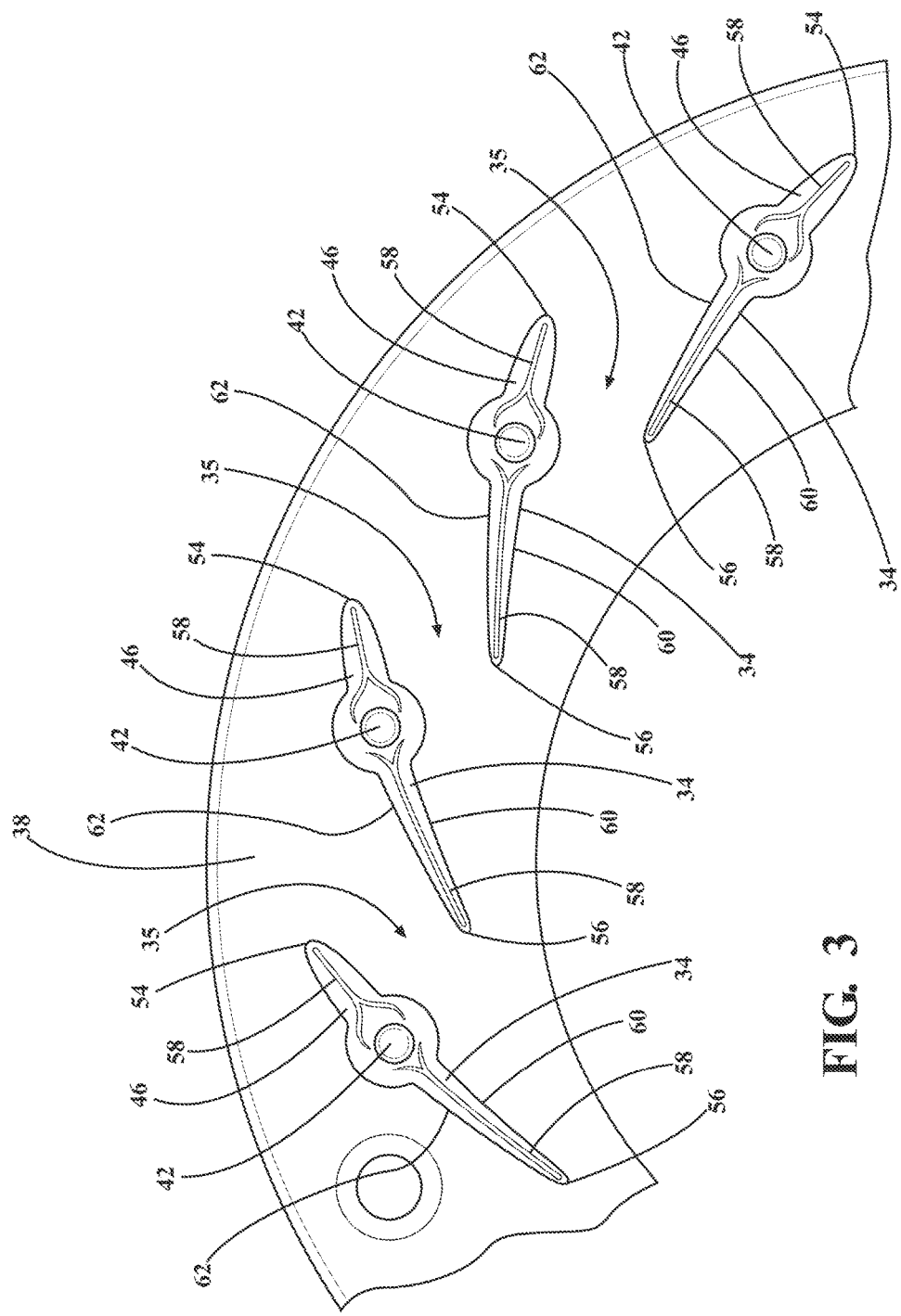
FIG. 3 is a fragmentary, planar view of a plurality of guide vanes supported by a vane support ring.

Referring to FIGS. 1 through 3, the guide vanes 34 are arranged circumferentially around the axis of rotation R. Each guide vane 34 includes a body 36 and is supported between a vane support ring 38 and a ring-shaped wall 40 of the turbine housing 18 by a pivot shaft 42. Alternatively, the guide vanes 34 may be supported by the pivot shafts 42 between the vane support ring 38 and a vane thrust ring (not shown), without varying from the scope of the invention. The vane support ring 38 is securely mounted to the turbine housing 18 on one side of the wheel inlet 28, generally toward the bearing housing 16. The ring-shaped wall 40 or the vane thrust ring is spaced apart from the vane support ring 38 in the axial direction and is disposed on the other side of the wheel inlet 28, generally toward the turbine wheel 24. The pivot shafts 42 extend in an axial direction from a first edge 44 of the body 36 of the guide vanes 34 and penetrate through corresponding bores of the vane support ring 38. The pivot shafts 42 also extend in the axial direction from a second edge 46 of the body 36 of the guide vanes 34 and are inserted into corresponding bores of the ring-shaped wall 40 or the vane thrust ring. In an alternative embodiment, the pivot shafts 42 may extend only from the first edge 44 of the guide vanes 34 and penetrate through the bores of the vane support ring 38, without varying from the scope of the invention.

In order to control the angular position of the guide vanes 34, an actuation device 47 is provided having a control housing 48, which controls an actuation movement of a pestle member 50 housed therein. The actuation movement of the pestle member 50 is converted into rotational movement of a control ring 52 that is positioned adjacent to the vane support ring 38 on a side facing the compressor housing 14. The control ring 52 is operatively coupled to the pivot shafts 42 of the guide vanes 34 such that rotational movement of the control ring 52 in opposite first and second directions enables adjustment of the guide vanes 34 between an open or generally radially extending position to allow the exhaust gas to pass through the wheel inlet 28 to the turbine wheel 24 and a closed or generally tangentially extending position to block the exhaust gas from passing through the wheel inlet 28 to the turbine wheel 24. In FIG. 1, the guide vanes 34 are shown in the open position. The guide vanes 34 are adjustable through a range of angular positions between the open position and the closed position depending on the desired flow of the exhaust gas to the turbine wheel 24. In FIG. 3, the guide vanes 34 are shown in an angular position between the open and closed positions.

With the guide vanes 34 in the closed position, the guide vanes 34 are arranged in an end-to-end overlapping fashion to block or prevent the exhaust gas from flowing through the wheel inlet 28 to the turbine wheel 24. More specifically, the angular position of the guide vanes 34 in the closed position is such that a leading edge 54 of each guide vane 34 overlaps a trailing edge 56 of the adjacent guide vane 34, thereby blocking the wheel inlet 28.

Spacing between the vane support ring 38 and the ring-shaped wall 40, in conjunction with the width of the guide vanes 34, is critical to prevent leakage of the exhaust gas around the first and second edges 44, 46 of the guide vanes 34 when the guide vanes 34 are in the closed position. It is typically desirable to have a certain amount of clearance between the first edge 44 and the vane support ring 38 and the second edge 46 and the ring-shaped wall 40 to permit free movement of the guide vanes 34 and to allow for thermal expansion due to the hot exhaust gas. However, as a result of this clearance, some exhaust gas will leak around the first and second edges 44, 46 of the guide vanes 34 when the guide vanes 34 are in the closed position. In order to prevent or minimize such leakage, a first flow feature, generally shown at 58 in FIG. 2, is formed along the first and second edges 44, 46 of the guide vanes 34. The first flow feature 58 is located on the first and second edges 44, 46 generally midway between a front surface 60 and a rear surface 62 of each guide vane 34. The first flow feature 58 may be a groove recessed into the body 36 of the guide vane 34 or a rib protruding from the body 36 of the guide vane 34. In either instance, the first flow feature 58 is designed to disturb the flow of the exhaust gas as the exhaust gas attempts to flow around the first and second edges 44, 46, thereby preventing or minimizing the exhaust gas that will leak around the first and second edges 44, 46 of the guide vanes 34 in the closed position. Only the first flow feature 58 on the second edge 46 of the guide vane 34 is shown in FIGS. 2 and 3. In the present embodiment, the first flow feature 58 extends along the second edge 46 of the guide vane 34 from the leading edge 54 and splits as it approaches the pivot shaft 42 to extend partially around the pivot shaft 42 in a circumferential manner. Similarly, the first flow feature 58 extends along the second edge 46 of the guide vane 34 from the trailing edge 56 and splits as it approaches the pivot shaft 42 to extend partially around the pivot shaft 42 in a circumferential manner. Preferably, the first flow feature 58 will extend uninterrupted around the pivot shaft 42 such that the first flow feature 58 extends continuously between the leading and trailing edges 54, 56. It is further contemplated that the design of the first flow feature 58 may vary depending upon the specific design of the guide vanes 34 without varying from the scope of the invention. For example, the depth and width of the recessed groove or the height and width of the raised rib may vary according to the specific design criteria. It is also contemplated that the first flow feature 58 may extend along both the first and second edges 44, 46 of the guide vanes 34 or may extend along only one of the first and second edges 44, 46. Further still, it is contemplated that multiple first flow features 58 may be incorporated along the first and second edges 44, 46 of the guide vanes 34.

Spacing between the vane support ring 38 and the ring-shaped wall 40, in conjunction with the width of the guide vanes 34, is also critical to prevent leakage of the exhaust gas around the first and second edges 44, 46 of the guide vanes 34 when the guide vanes 34 are in the open position, or some angular position between the open and closed positions. When the guide vanes 34 are opened, the guide vanes 34 define the flow channels 35, thereby regulating the exhaust gas flowing through the wheel inlet 28 to the turbine wheel 24. The exhaust gas is guided by the front and rear surfaces 60, 62 of adjacent guide vanes 34 as the exhaust gas flows along the guide vanes 34 from the leading edge 54 to the trailing edge 56. As the exhaust gas flows between adjacent guide vanes 34, a high pressure region develops along the front and rear surfaces 60, 62 and a low pressure region develops along the first and second edges 44, 46. The high and low pressure regions may cause swirling of the exhaust gas and/or cross flow of the exhaust gas from the high pressure region toward the low pressure region, i.e., from the front and rear surfaces 60, 62 toward the first and second edges 44, 46. The first flow feature 58 is designed to disturb the flow of the exhaust gas as the exhaust gas attempts to flow around the first and second edges 44, 46, thereby preventing or minimizing the exhaust gas that will leak around the first and second edges 44, 46 of the guide vanes 34 in the open position.

With the guide vanes 34 opened, as noted above, high and low pressure regions will develop and may cause swirling of the exhaust gas and/or cross flow of the exhaust gas from the front and rear surfaces 60, 62 toward the first and second edges 44, 46. In order to prevent or minimize such swirling and/or cross flow, a second flow feature, generally shown at 64 in FIG. 2, is formed along the front and rear surfaces 60, 62 of the guide vanes 34. The second flow feature 64 may be a groove recessed into the body 36 of the guide vane 34 or a rib protruding from the body 36 of the guide vane 34. In either instance, the second flow feature 64 is designed to channel the flow of the exhaust gas along the guide vanes 34 from the leading edge 54 to the trailing edge 56, thereby preventing or minimizing swirling of the exhaust gas. The second flow feature 64 will also prevent or minimize cross flow of the exhaust gas. Only the second flow feature 64 on the front surface 60 of the guide vane 34 is shown in FIG. 2. It is contemplated that one or more second flow feature 64 may be formed along the front and rear surfaces 60, 62 of the guide vanes 34. In the present embodiment, a pair of second flow features 64 is spaced apart on the front surface 60 of the guide vane 34 and the pair of second flow features 64 extends substantially parallel from the leading edge 54 to the trailing edge 56. It is further contemplated that the second flow feature 64 may extend along both the front and rear surfaces 60, 62 of the guide vanes 34 or may extend along only one of the front and rear surfaces 60, 62 of the guide vanes 34 without varying from the scope of the invention. Further still, it is contemplated that the guide vanes 34 may include both the first and second flow features 58, 64 or may include only the first flow feature 58 or only the second flow feature 64.

Figure 4:
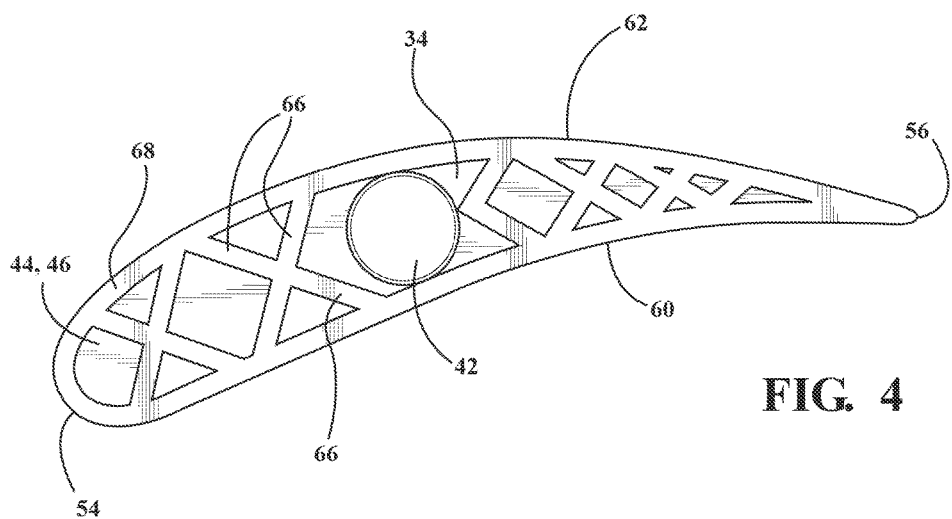
FIG. 4 is a planar view of a guide vane with first flow features according to a second embodiment of the invention.

Referring to FIG. 4, in a second embodiment of the invention the guide vanes 34 include an alternative layout of first flow features on the first and second edges 44, 46 thereof. More specifically, a plurality of inner raised ribs 66 is arranged in a crossing pattern extending between an outer raised rib 68 encircling a periphery of the first and second edges 44, 46 of the guide vanes 34. The inner raised ribs 66 extend in a direction generally between the front and rear surfaces 60, 62 of the guide vanes 34. As in the first embodiment, the alternative layout of first flow features 66, 68 is designed to disturb the flow of the exhaust gas as the exhaust gas attempts to flow around the first and second edges 44, 46, thereby preventing or minimizing the exhaust gas that will leak around the first and second edges 44, 46 of the guide vanes 34. Without limiting the invention, it is contemplated that in one embodiment, a height H of the inner raised ribs 66 is one quarter a perpendicular distance D between adjacent inner raised ribs 66. In other words, the height H is equal to 0.25 D. Thus, as the inner raised ribs 66 are positioned closer together toward the trailing edge 56 of the guide vanes 34, the height H of the inner raised ribs 66 will decrease.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A guide vane for regulating a flow of exhaust gas through a wheel inlet to a turbine wheel in a variable turbine geometry turbocharger, said guide vane comprising:

a body extending between a leading edge and a trailing edge, said body including opposing first and second edges and opposing front and rear surfaces, wherein said first edge is adjacent to one side of the wheel inlet and said second edge is adjacent to another side of the wheel inlet; and a pivotal shaft extending in the axial direction from at least the first edge; and at least one flow feature disposed on said body of said guide vane for manipulating the flow of exhaust gas during use of the turbocharger, wherein the first flow feature comprises a raised rib protruding from the body and extending from a surface of one of the first or second edges in the axial direction of pivotal shaft, and wherein the rib splits, and wherein the rib is constructed and arranged to disturb the flow of exhaust gas as the exhaust gas attempts to flow around one of the first or second edges to prevent or minimize exhaust gas from leaking around one of the first or second edges.

2. The guide vane as set forth in claim 1 wherein the pivotal shaft extends in the axial direction from the second edge, and wherein the raised rib splits near the pivotal shaft.

3. The guide vane as set forth in claim 2 wherein the at least one flow feature extends from said leading edge of said body to said trailing edge of said body.

4. The guide vane as set forth in claim 3 the at least one flow feature extends continuously from said leading edge of said body to said trailing edge of said body.

5. The guide vane as set forth in claim 4 further comprising a second flow feature is positioned generally midway between said front and rear surfaces of said guide vane.

6. The guide vane as set forth in claim 5 further comprises a groove recessed into said body of said guide vane.

7. The guide vane as set forth in claim 1 including a second flow feature on at least one of said front and rear surfaces, wherein said second flow feature guides the flow of exhaust gas along said at least one of said front and rear surfaces.

8. The guide vane as set forth in claim 7 wherein said second flow feature extends from said leading edge of said body to said trailing edge of said body.

9. The guide vane as set forth in claim 8 wherein said second flow feature extends continuously from said leading edge of said body to said trailing edge of said body.

10. The guide vane as set forth in claim 9 including at least a pair of second flow features spaced apart and extending generally parallel to one another.

11. The guide vane as set forth in claim 10 wherein said second flow feature is a rib protruding from said body of said guide vane.

12. The guide vane as set forth in claim 10 wherein said second flow feature is a groove recessed into said body of said guide vane.

13. The guide vane as set forth in claim 2 wherein said first flow feature includes an outer raised rib and a plurality of inner raised ribs, said outer raised rib encircling a periphery of at least one of said first and second edges, and said plurality of inner raised ribs extending between said outer raised rib.

14. The guide vane as set forth in claim 13 wherein said plurality of inner raised ribs extend generally between said front and rear surfaces of said guide vane.

15. A product comprising a guide vane for regulating a flow of exhaust gas through a wheel inlet to a turbine wheel in a variable turbine geometry turbocharger, said guide vane comprising:
   a body extending between a leading edge and a trailing edge, said body including a first side edge and an opposite second side edge and a front surface and an opposed rear surface, wherein said first side edge is adjacent to one side of the wheel inlet and said second side edge is adjacent to another side of the wheel inlet;
   a pivot shaft extending through the body from the first side edge to the second side edge, the pivotal shaft having an axis and the pivotal shaft extending axially from the first side edge, and the pivotal shaft extending axially from the second side edge, the pivot shaft having a front face portion adjacent the front surface and a rear face portion adjacent the rear surface;
   at least one flow feature disposed on said body of said guide vane for manipulating the flow of exhaust gas during use of the turbocharger, wherein the first flow feature comprises a raised rib protruding from the body and extending from a surface of one of the first or second edges in the axial direction of the pivotal shaft, and wherein the raised rib splits so that one portion of the raised rib extends around at least a portion of the front face of the pivot shaft and another portion of the raised rib extends around at least a portion of the rear face of the pivot shaft, and wherein the raised rib is constructed and arranged to disturb the flow of exhaust gas as the exhaust gas attempts to flow around one of the first or second edges to prevent or minimize exhaust gas from leaking around one of the first or second edges.

16. A product comprising a guide vane for regulating a flow of exhaust gas through a wheel inlet to a turbine wheel in a variable turbine geometry turbocharger, said guide vane comprising:
   a body extending between a leading edge and a trailing edge, said body including a first side edge and an opposite second side edge and a front surface and an opposed rear surface, wherein said first side edge is adjacent to one side of the wheel inlet and said second side edge is adjacent to another side of the wheel inlet;
   at least one flow feature disposed on said body of said guide vane for manipulating the flow of exhaust gas during use of the turbocharger, wherein the first flow feature comprises a Y-shaped raised rib protruding from the body and extending perpendicularly from a surface of one of the first or second edges, and wherein the rib is constructed and arranged to disturb the flow of exhaust gas as the exhaust gas attempts to flow around one of the first or second edges to prevent or minimize exhaust gas from leaking around one of the first or second edges.

17. A product as set forth in claim 16 further comprising a pivot shaft extending through the body from the first side edge to the second side edge, the pivot shaft having a front face portion adjacent the front surface and a rear face portion adjacent the rear surface; wherein the Y-shaped raised rib is constructed and arranged so that one portion of the rib extends around at least a portion of the front face of the pivot shaft and another portion of the rib extends around at least a portion of the rear face of the pivot shaft.

* * * * *